United States Patent Office 3,371,523
Patented Mar. 5, 1968

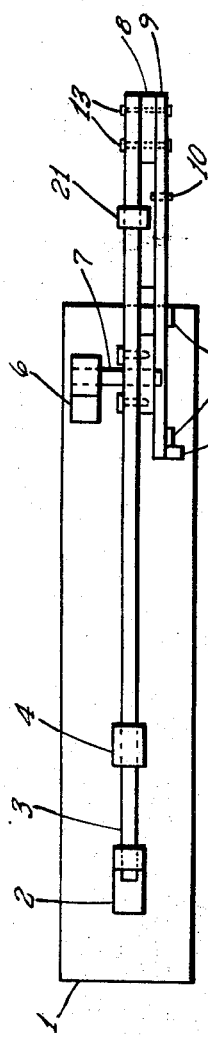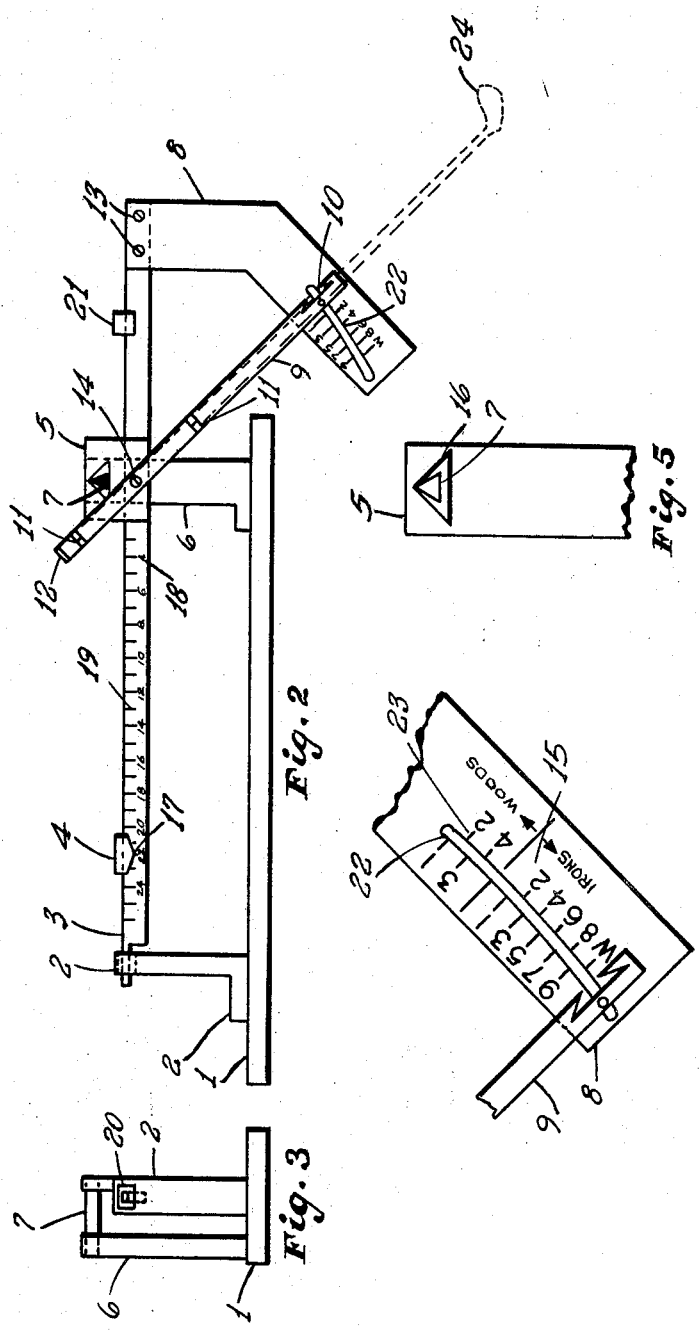

3,371,523
GOLF CLUB SWING WEIGHT BALANCE
James B. Crouch, 1959 Shirley Drive, and Harold E. Eagle, 2139 Woodland Ave., both of Burlington, N.C. 27215
Filed Sept. 20, 1965, Ser. No. 489,803
3 Claims. (Cl. 73—65)

ABSTRACT OF THE DISCLOSURE

This invention relates broadly to the field of sports and more specifically to a device for weighting various types of sports equipment, such as golf clubs or other implements which are wielded by hand when in use, to determine the feel exerted on the user at the instant the equipment is started in motion.

The present accepted standard for measuring and matching the swing weight of a set of golf clubs is a simple balance. Each club of a set of golf clubs is pivoted over a point fourteen inches from the shaft end and the head is weighted so that the same force on the shaft will balance each club in a horizontal position. The force applied to balance the club is changed as the desired swing weight changes. One familiar with the game of golf and skilled in the art of weight measuring devices realizes that such a balance is never achieved in the static or dynamic state when the instruments are properly swung. Therefore, the clubs of a set so balanced by the present method do not feel the same when they are swung. The object of this invention is the provision of a golf club scale adaptable to measuring the feel exerted on the user by each club of a set, whereby, the normal grip and proper angle to the horizontal at the address position for each club of a set is employed. Whereas, to facilitate the modification of length and distribution of weight for each club of a set to such a degree as may be necessary to obtain the same balance for each club of a set to the requirements of the particular individual.

Specification

The most important object of this invention is the provision of a golf club scale which will measure the swinging balance of each club of a set at the angle to the horizontal at which it is swung. (A driver forms an angle of approximately 45° with the ground while a 9 iron forms an angle of approximately 60° with the ground at the address position).

Another important object of this invention is the provision of a scale which measures the swinging balance of the golf club around a pivot point at the center of the club grip.

A further object of this invention is the provision of a scale which will measure the swinging balance of the golf club in absolute terms of inch-pounds to balance each club around the pivot point at the angle of use as described above.

Another object of this invention is the provision of a scale which will not require rebalancing when it is adjusted to the different angles required for each club of the set.

Other objectives will be made clear or become apparent during the course of the following specification, reference being had to the accompanying drawing, wherein:

FIGURE 1 is a top plan view of a golf club scale made in accordance with our present invention.

FIGURE 2 is a side elevational view thereof showing a golf club positioned thereon for determining its swinging balance.

FIGURE 3 is a left end view of FIGURE 2.

FIGURE 4 is a fragmentary detailed view showing the club index marks 15 on the angle adjust arm 8.

FIGURE 5 is a fragmentary view of the pivot point.

Many of the more popular sports today have developed to a point where the players require the tools utilized to be highly accurate in balance, weight, durability and other factors. This has become particular true with respect to the game of golf since experience has taught that more accurate games can be played if the golf clubs themselves are produced to be particularly adaptable to the individual player. The size, weight and shape of the golf club head as compared with the handle, thereafter, and its length is highly important, therefore, not only the weight of such clubs must be determined but their swinging balance also made known to the player. The scale about to be described measures the balance of each club of a set at the approximate angle of the plane in which it is swung and will result in producing a set of clubs which are more nearly matched to give the exact same feel when swung than clubs manufactured according to present standards.

In the drawing a flat elongated base broadly designated by the numeral 1, supports a pair of spaced apart upstanding members 2 and 6. An elongated bar constituting the scale beam and designated by the numeral 3 has graduations 19 formed thereon marked by suitable indicia 18 which indicate the balance of the club in inch-pounds of torque as indicated by the pointer 17 of counterpoise 4.

This bar 3 is pivotally mounted to the upstanding member 6 by means of a pivot plate 5 and pivot bar 7. An inverted V shaped hole 16 is formed near the top of the pivot plate 5 for receiving the pivot bar 7 which is rigidly fastened to the upstanding member 6. Pivot plate 5 is attached to the scale beam 3 by means of screws or the like. As clearly indicated in FIGURE 5 this pivot bar 7 is triangular shaped in the transverse cross section and supports the pivot plate 5. The angles of the hole 16 in the pivot plate 5 are greater than that of the pivot bar 7 to the end that the scale beam 3 is free to swing on the horizontal axis formed by pivot bar 7.

Standing member 2 has a notch 20 at the uppermost end thereof to receive the proximal end of the scale beam 3. The notch 20 limits the extent of the swinging movement of scale beam 3 on pivot bar 7.

Two clamps 11 are attached to the club holding arm 9 to receive the handle of the golf club. The club shaft stop 12 is positioned so that when the club handle is placed against the stop and inserted in the holding clamps 11, the club grip is centered directly under the pivot point. A counter weight 21 is secured to scale beam 3, and is initially adjusted and locked on scale beam 3 so that the scale balances without a club and with counterpoise 4 temporarily removed.

An angle adjust arm 8 is attached to scale beam 3 with suitable bolts 13. Club holding arm 9 is peened to scale beam 3 by bolt 14 such that it is free to rotate in a vertical plane around bolt 14. Its swing is restricted by bolt 10 which passes through the elongated notch 22 in the angle adjust arm 8. As clearly shown in expanded view 4 notch 22 is marked with suitable graduations 23 and indicia 15 such that the club holding arm 9 can be adjusted such that the swing weight is measured at the approximate angle at which the club is normally swung. As can be seen in FIGURE 4 each club of a set is measured at a different angle. The club holding arm 9 is locked at the approximate angle by a captive wing nut (not shown) on bolt 10.

A counterpoise 4 slides along beam scale 3 until the scale beam balances with its end centered in notch 20. The swing balance is read on scale beam 3 graduations 19 and indicia 18 under the pointer 17 of counterpoise 4.

It is clear from the foregoing that when the golf club 24 is positioned upon the holding arm 9 as illustrated in FIGURE 2 the swinging balance is determined as follows:

The club holding arm 9 is moved to the appropriate club number as indicated on the angle adjust arm 8. The counterpoise 3 is moved along the scale beam 3 until the scale is in balance. The graduations 19 are then used to record the swinging balance of the club, in inch-pounds of torque around the center of the club grip, which may be compared with other clubs of the set to the end that an individual player may have a set of golf clubs wherein each club has the same swinging balance.

While the foregoing specifications have been limited to the measurement of golf clubs, it is apparent that the scale may be easily used or simply modified to accommodate various types of elongated objects for determining their swinging balance.

Manifestly many changes and modifications may, therefore be made without departing from the spirit of this invention as defined by the scope of the appended claims.

Having thus described the invention, what is claimed as new and desired to be secured by Letters Patent is:

1. A balance comparison device for different golf clubs of a set wherein the different clubs have different angles of swing with respect to the ground, comprising (a) an elongated horizontal beam pivotally mounted between its ends; (b) mounting means on one end of said beam for supporting a club such that the center of the grip is directly under the pivot mount of said beam; (c) said mounting means including a fixture for adjustably mounting the club at its prescribed angle of swing with the horizontal; (d) means on the other end of said beam for balancing said beam about said pivot.

2. The device of claim 1 wherein the mounting means comprises clamps and a stop for positioning the club so that its center of grip is directly under said pivot point.

3. The device of claim 1 wherein said balancing means comprises scale indicia to provide a measure of the swing weight about the center of the club grip.

References Cited

UNITED STATES PATENTS

| | | | |
|---|---|---|---|
| 1,953,916 | 4/1934 | Adams | 73—65 |
| 2,094,806 | 10/1937 | Murdoch | 73—65 |
| 2,595,717 | 5/1952 | Smith | 73—65 |

JAMES J. GILL, *Primary Examiner.*

RICHARD C. QUEISSER, *Examiner.*

R. S. SALZMAN, *Assistant Examiner.*